Figure 1:
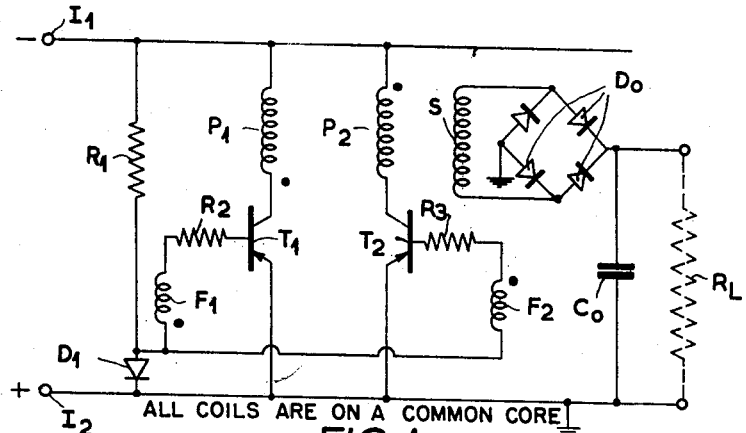

Dec. 5, 1961  T. H. BROWN  3,012,205
INVERTER AND LIKE CIRCUITS EMPLOYING TRANSISTORS
Filed Jan. 31, 1958

INVENTOR
THOMAS HENRY BROWN
BY
Frank R. Trifari
AGENT

United States Patent Office 3,012,205
Patented Dec. 5, 1961

3,012,205
INVERTER AND LIKE CIRCUITS EMPLOYING TRANSISTORS
Thomas Henry Brown, Old Coulsdon, England, assignor to North American Philips Company, Inc., New York, N.Y.
Filed Jan. 31, 1958, Ser. No. 712,414
4 Claims. (Cl. 331—109)

This invention relates to inverter and like circuits employing transistors.

Such circuits may be used as inverters proper to give an A.C. output or they may be used in so-called D.C. converters in which the alternating output is rectified for use as a D.C. output, usually of higher voltage than the D.C. input.

In many transistor inverter circuits there is a danger of excessive power dissipation in the transistors occurring as a result of a short-circuit across the load or other abnormal increase in the load current.

It is the principal object of the present invention to provide improved transistor inverter circuits capable of preventing, automatically and reliably, damage to the transistors due to such causes.

According to one aspect of the invention an inverter circuit arrangement comprises a pair of input terminals for connection to a D.C. input source, a transistor in a circuit adapted to operate as an inverter to supply an output voltage to a pair of output terminals provided for connection to a load, means for monitoring the said output voltage or a voltage substantially proportional thereto, and protection means adapted to cause cessation or reduction of power dissipation in the transistor in response to departure of said voltage from a predetermined level or range of levels.

According to a further aspect of the invention, a push-pull inverter circuit arrangement comprises a pair of input terminals for connection to a D.C. input source, two transistors in a circuit adapted to operate as a push-pull inverter to supply an output voltage to a pair of output terminals provided for connection to a load, means for monitoring the said output voltage or a voltage substantially proportional thereto, and protection means adapted to cause cessation or reduction of power dissipation in the transistors in response to departure of said voltage from a predetermined level or range of levels.

The collector voltage of each transistor has preferably a substantially square wave-form, and the monitor means may be arranged to monitor only the level of the waveform corresponding to the conducting state (i.e. the more positive level in the case of a p-n-p transistor). In the latter event, a push-pull inverter may employ a pair of rectifiers to provide a substantially smooth D.C. voltage corresponding to the mean value of the said voltage level for operation of the protection means. By contrast, an asymmetrical inverter circuit employing only one inverter transistor gives a monitored wave which may require considerable smoothing for use in controlling the protection means.

The monitored voltage may be compared with a predetermined reference voltage.

Each inverter transistor may be a junction transistor having connected across its emitter-base path the emitter-collector path of an auxiliary transistor controlled by the protection means, said protection means being adapted to render the emitter-collector path of said auxiliary transistor highly conductive under over-load conditions.

In the case of a push-pull circuit, the inverter transistors may have their collector circuits coupled together and to the output or load terminals by a transformer. Moreover, in the case of a self-excited inverter circuit, transformer means may be used for providing feedback coupling between the emitter-collector circuit and emitter-base circuit of each inverter transistor. Embodiments of the invention employing transformer means for both these purposes will now be described by way of example with reference to the accompanying diagrammatical drawing.

FIGURE 1 shows an already known self-excited push-pull inverter circuit to which protection means in accordance with the invention may be applied. In the circuit of FIGURE 1, p-n-p junction transistors $T_1$ and $T_2$ are alternately bottomed when the circuit is oscillating. In the bottomed condition of a transistor, power dissipation occurs at a safe level due to the very low voltage drop across the transistor. The characteristics of the transistors are such that excessive dissipation takes place if conduction is allowed to occur with the higher voltage drop conditions obtaining outside the bottoming region.

The frequency of oscillation is controlled by the saturation characteristics of the transformer core material. Elements $R_1$, $D_1$, connected across D.C. input terminals $I_1$—$I_2$, are used to bias $T_1$ and $T_2$ to a point where the loop gain is greater than unity and so initiate oscillation. Resistors $R_2$ and $R_3$ are of equal value and limit the base current of transistors $T_1$ and $T_2$. Diode $D_1$ functions to provide a small initial forward bias. This forward bias decreases with an increase in the base-drive current, since the forward resistance of diode $D_1$ drops when the current flowing therethrough increases.

Under overload conditions, the circuit is capable of oscillating with $T_1$ and $T_2$ out of bottoming when in the conducting state, in which case excessive power is dissipated in the transistors as aforesaid. If the overload is such that the circuit ceases to oscillate, excessive power may still be dissipated by the transistors since they are biased on by the current through resistor $R_1$.

In the circuit of FIGURE 1, the two junction transistors $T_1$—$T_2$ act as switches which are closed alternately so that the D.C. input voltage from input terminals $I_1$—$I_2$ is applied to each of the primary windings ($P_1$—$P_2$) in turn. The transistors are switched on and off alternately by feedback applied to their base electrodes by feedback windings $F_1$—$F_2$. The windings $P_1$ and $F_1$ are on a common magnetic core and the same applies to the pair of windings $P_2$—$F_2$. Each pair may, if desired, be on a separate core, in which case each transformer unit has a secondary winding with the two secondaries connected in parallel to couple the cores and provide a common A.C. wave. Preferably, however, all the windings $P_1$, $P_2$, $F_1$, $F_2$ are wound on a common core with a secondary winding S. The A.C. wave of the secondary winding may be used directly as the output of the circuit arrangement, or it may be rectified if it is desired to use the circuit as a D.C. converter. An example of such an optional rectifying arrangement is shown in FIGURE 1 and comprises a bridge of rectifiers $D_0$ connected to a load $R_L$ shunted by a smoothing capacitor $C_0$.

Figure 2:
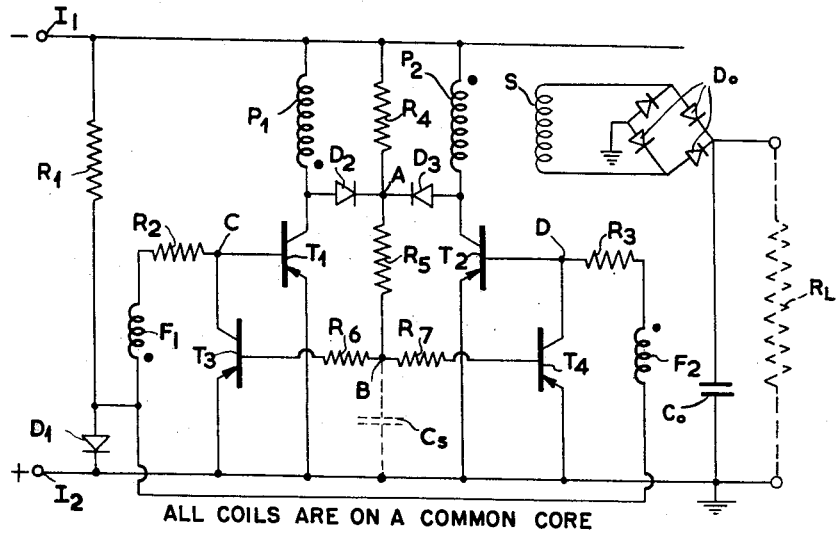
Figure 3:
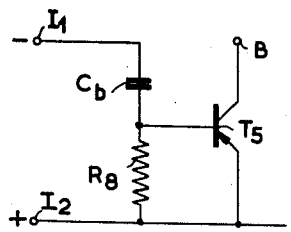

FIGURE 2 shows the inverter section of the circuit of FIGURE 1 together with a monitor and protection circuit in accordance with the invention; and FIG. 3 shows a variant of the circuit arrangement of FIG. 2.

The collector voltage of each of transistors $T_1$, and $T_2$ has a substantially square wave-form, and the monitor means are arranged to monitor only the level of the waveform corresponding to the conduction state i.e. the more positive level. A pair of rectifiers $D_2$, $D_3$ is used to provide a substantially smooth D.C. voltage corresponding to the mean value of the said voltage level for operation of the protection means. The latter means include auxiliary transistors $T_3$—$T_4$ each of which has its emitter-collector path connected across the emitter-base path of one of the main or push-pull transistors.

The collectors of transistors $T_1$—$T_2$ are connected to point A via the rectifiers $D_2$—$D_3$, the point A being on a potential divider circuit comprising resistors $R_4$—$R_5$—$R_6$—$R_7$ and leading to the base electrodes of transistors $T_3$—$T_4$. $R_6$ and $R_7$ have equal values.

The operation of the circuit is as follows. Assuming that the circuit is oscillating under normal load conditions, point A will be slightly negative with respect to earth, since it is held approximately at the bottoming voltage of transistor $T_1$ or $T_2$. At a time when transistor $T_1$ is conducting and transistor $T_2$ is cut off, point C will be negative and point D positive with respect to earth. Since point D is positive with respect to point A, the collector diode of transistor $T_4$ will be in conduction and, by choosing appropriately the ratio of $R_5$ to $R_7$, point B may be made positive with respect to earth so that transistor $T_3$ is cut off. Similar action occurs on the other half cycle with transistor $T_2$ conducting.

On over-load, the output voltage will decrease. If, as a result, either transistor $T_1$ or transistor $T_2$ comes out of bottoming while in the conducting state, points A and B will both be negative and will cause transistors $T_3$ and $T_4$ to conduct, which increases the voltage drop across $R_2$ and $R_3$ and so reduces the base drive to transistors $T_1$ and $T_2$. The action is cumulative, since decrease in drive causes $T_1$ and $T_2$ to come further out of bottoming, and oscillation ceases and does not restart. The chain of resistors $R_4$, $R_5$, $R_6$ and $R_7$ has a resistance such that transistors $T_3$ and $T_4$ are bottomed and thus hold the bases of transistors $T_1$ and $T_2$ at a low potential via a low impedance.

It is advantageous for the protection circuit to control the inverter transistors $T_1$—$T_2$ in this manner for the following reason. When a very low impedance is placed across the emitter-base path of transistors $T_1$—$T_2$ by bottoming of transistors $T_3$—$T_4$, transistors $T_1$—$T_2$ are left with low collector currents only slightly greater than the cut-off current $I_{co}$. In this collector-current region, and with their emitter-base voltage almost down to zero, transistors $T_1$—$T_2$ operate with a turn-over voltage which is materially greater than the turn-over voltage which would obtain if the protection circuit were to control transistors $T_1$—$T_2$ by open-circuiting their emitter-base sections. This in turn permits higher supply voltages to be applied safely at terminals $I_1$—$I_2$ and increases the efficiency of the circuit arrangements.

An asymmetric inverter circuit arrangement corresponding substantially to one half of the arrangement of FIGURE 2 may be used with smoothing means for smoothing the square-wave voltage component which appears at point A when over-loading occurs. In the absence of over-loading, the voltage at point A is made to constitute a pre-determined reference voltage by connecting point B through a further resistor to a source of positive potential, for example +1 volt.

In a practical embodiment of the circuit arrangement of FIG. 2, a capacitor $C_s$ of 25 μf. was connected between points B and $I_2$ in order to facilitate starting of the oscillations. The sum of the resistances of resistors $R_4$ and $R_5$ was 1000 ohms and the action of the protection circuit was accordingly slowed down to some extent. This draw-back can however, be overcome by substituting the emitter-collector path of a fifth transistor $T_5$ for said starting capacitor, as shown on FIG. 3, the emitter being connected to point $I_2$ and the base of said transistor being connected to its emitter through a resistor $R_8$ and to point $I_1$ by way of a capacitor $C_b$. The fifth transistor thus becomes conductive when switching on the circuit arrangement and remains conductive until its base capacitor has become charged through its base resistor, thus facilitating starting of the oscillator, but it does not introduce a time constant in the base circuit of the transistors $T_3$ and $T_4$ and does not slow down the action of the protection circuit.

What is claimed is:

1. An inverter circuit arrangement comprising a pair of input terminals for connection to a direct voltage source, a pair of junction transistors each having base, emitter and collector electrodes, a feedback transformer having a pair of first winding portions arranged in balanced relationship with respect to each other and connected across said pair of input terminals, each in series with the collector-emitter path of one of said transistors, and a pair of second winding portions each connected across the base-emitter path of one of said transistors, each arranged in regenerative feedback relationship with respect to the first winding portion connected to the collector-emitter circuit of the same transistor, said transistors operating as a push-pull inverter producing output voltage pulses across said first winding portions and across a pair of output terminals coupled thereto for connection to a load, monitoring means coupled to said pair of first winding portions for monitoring the level of the output voltage pulses, and overload protection means connected across the base-emitter path of each transistor, said overload protection means operating in response to said monitoring means to reduce the forward base current of each transistor when the level of said output voltage pulses falls below a predetermined level, said output voltage pulses having a substantially square waveform and said monitoring means operating to monitor the level of said pulses corresponding only to the conductive state of each transistor, said monitoring means comprising a pair of rectifiers, one electrode of each rectifier being connected to the collector electrode of one transistor respectively, and the other electrodes of the rectifiers being connected to a common point, said rectifiers supplying a substantially smooth direct voltage corresponding to the mean value of said output voltage pulses for operating said protection means.

2. A circuit arrangement according to claim 1, wherein said overload protection means comprises a pair of auxiliary transistors each having collector, emitter and base electrodes, the collector-emitter path of each auxiliary transistor being connected across the base-emitter path of each junction transistor respectively, the base electrodes of the auxiliary transistors being coupled to said common point.

3. An inverter circuit arrangement comprising a pair of input terminals connected to a direct voltage source, a junction transistor having base, emitter and collector electrodes, a feedback transformer having a first winding portion connected across said pair of input terminals in series with the collector-emitter path of said transistor, and a second winding portion connected across the base-emitter path of said transistor and arranged in regenerative feedback relationship with respect to said first winding portion, said transistor operating as an inverter producing an output voltage across said first winding portion and across a pair of output terminals coupled thereto and adapted for connection to a load, monitoring means coupled to said first winding portion for monitoring the level of the output voltage pulses corresponding only to the conductive state of the transistor, and overload protection means connected across the base-emitter path of said transistor, said overload protection means operating in response to said monitoring means to reduce the forward base current of the transistor when the level of said output voltage pulses falls below a predetermined value, said monitoring means comprising a rectifier having one electrode connected to said collector electrode and its other electrode resistively coupled to one of said input terminals, said other electrode supplying a direct voltage to said overload protection means, said direct voltage having a mean value corresponding to the mean value of the output voltage pulses.

4. A circuit arrangement according to claim 3, wherein said overload protection means comprises an auxiliary transistor having emitter, base and collector electrodes, the emitter-collector path of the auxiliary transistor being connected across the base-emitter path of the junction transistor and the base electrode of the auxiliary transistor being coupled to said other electrode of the rectifier.

References Cited in the file of this patent

UNITED STATES PATENTS

| | | |
|---|---|---|
| 2,702,861 | Wingate | Feb. 22, 1955 |
| 2,784,367 | Von De Polder | Mar. 5, 1957 |
| 2,791,739 | Light | May 7, 1957 |
| 2,793,292 | Wolff | May 21, 1957 |
| 2,854,614 | Light | Sept. 30, 1958 |
| 2,854,615 | Light | Sept. 30, 1958 |
| 2,874,293 | McMurren | Feb. 17, 1959 |
| 2,950,446 | Humez et al. | Aug. 23, 1960 |